(12) United States Patent
Mercier et al.

(10) Patent No.: US 9,977,961 B2
(45) Date of Patent: May 22, 2018

(54) METHOD FOR MAINTAINING DETECTION CAPABILITY WHEN A FRAME IN A MULTISPECTRAL IMAGE IS CORRUPTED

(71) Applicant: BAE SYSTEMS Information and Electronic Systems Integration Inc., Nashua, NH (US)

(72) Inventors: Michael N. Mercier, Nashua, NH (US); Joseph M. Schlupf, Newburyport, MA (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 243 days.

(21) Appl. No.: 14/918,196

(22) Filed: Oct. 20, 2015

(65) Prior Publication Data

US 2016/0117567 A1    Apr. 28, 2016

Related U.S. Application Data

(60) Provisional application No. 62/066,418, filed on Oct. 21, 2014.

(51) Int. Cl.
*G06K 9/66* (2006.01)
*G06K 9/00* (2006.01)
*G06T 7/00* (2017.01)

(52) U.S. Cl.
CPC .......... *G06K 9/0063* (2013.01); *G06T 7/0004* (2013.01); *G06K 2009/00644* (2013.01); *G06T 2207/10036* (2013.01); *G06T 2207/10048* (2013.01); *G06T 2207/30168* (2013.01); *G06T 2207/30232* (2013.01)

(58) Field of Classification Search
None
See application file for complete search history.

(56) References Cited

U.S. PATENT DOCUMENTS

| 7,053,928 | B1* | 5/2006 | Connors | G02B 23/12 348/162 |
| 7,855,786 | B2 | 12/2010 | Sparks et al. | |
| 7,880,773 | B2* | 2/2011 | Abe | H04N 9/045 348/223.1 |
| 8,849,380 | B2* | 9/2014 | Patwardhan | A61B 5/0059 600/310 |
| 8,977,002 | B2* | 3/2015 | Mercier | G06K 9/00624 382/103 |
| 9,047,678 | B2* | 6/2015 | O'Hara | G06T 7/2053 |
| 9,121,818 | B2* | 9/2015 | Funayama | G01J 3/027 |
| 9,342,883 | B2* | 5/2016 | Dommett | G06T 7/80 |

(Continued)

FOREIGN PATENT DOCUMENTS

CN    202522520 U  * 11/2012
CN    102590213 B  * 10/2016

*Primary Examiner* — Iman K Kholdebarin
(74) *Attorney, Agent, or Firm* — McCarter & English LLP; Scott J. Asmus (57) ABSTRACT

Exemplary embodiments provide a method, a system, and a computer readable medium for maintaining detection capability when a frame is corrupted. A plurality of data points of a multispectral gain in a frame is monitored. It is determined that the frame is corrupted by analyzing the plurality of data points. When the frame is corrupted, a single spectrum threat detection system is used instead of a multispectral threat detection system.

18 Claims, 9 Drawing Sheets

(56) References Cited

U.S. PATENT DOCUMENTS

| | | | |
|---|---|---|---|
| 9,354,115 B2* | 5/2016 | Darty | A61B 5/447 |
| 9,396,528 B2* | 7/2016 | Pacifici | G06T 5/001 |
| 9,689,669 B2* | 6/2017 | Ross, Jr. | G01B 11/272 |
| 9,785,837 B2 | 10/2017 | Mercier et al. | |
| 2005/0265584 A1* | 12/2005 | Dobson | G06K 9/00711 |
| | | | 382/104 |
| 2007/0146700 A1* | 6/2007 | Kowarz | G01J 3/02 |
| | | | 356/310 |
| 2007/0188610 A1* | 8/2007 | Micotto | G01C 11/025 |
| | | | 348/144 |
| 2008/0252738 A1* | 10/2008 | Abe | H04N 9/045 |
| | | | 348/222.1 |
| 2009/0268966 A1* | 10/2009 | Grady | G06T 5/20 |
| | | | 382/191 |
| 2011/0228142 A1* | 9/2011 | Brueckner | H04N 5/2254 |
| | | | 348/241 |
| 2012/0007979 A1* | 1/2012 | Schneider | G01J 3/36 |
| | | | 348/116 |
| 2012/0274799 A1* | 11/2012 | Wang | H04N 9/735 |
| | | | 348/222.1 |
| 2012/0275699 A1* | 11/2012 | O'Hara | G06T 7/2053 |
| | | | 382/168 |
| 2013/0076913 A1* | 3/2013 | Xu | H04N 5/23206 |
| | | | 348/169 |
| 2014/0253924 A1* | 9/2014 | Sano | G01J 3/2823 |
| | | | 356/456 |
| 2014/0320843 A1* | 10/2014 | Streuber | F41G 7/008 |
| | | | 356/4.01 |
| 2014/0334683 A1* | 11/2014 | Masuda | H04N 5/23212 |
| | | | 382/103 |
| 2014/0334692 A1* | 11/2014 | Uhrmann | G06K 9/2027 |
| | | | 382/110 |
| 2015/0117701 A1* | 4/2015 | Ross | G06K 9/00449 |
| | | | 382/100 |
| 2015/0302567 A1* | 10/2015 | Patterson | G06T 5/50 |
| | | | 382/191 |
| 2015/0356341 A1* | 12/2015 | Eccles | G06K 9/0063 |
| | | | 382/224 |
| 2015/0369728 A1* | 12/2015 | Bahatt | G01N 21/0332 |
| | | | 356/328 |
| 2016/0063352 A1* | 3/2016 | Scott | G06K 9/0063 |
| | | | 382/113 |
| 2016/0069743 A1* | 3/2016 | McQuilkin | G01J 3/2803 |
| | | | 356/416 |
| 2016/0117567 A1 | 4/2016 | Mercier et al. | |
| 2017/0328710 A1 | 11/2017 | Choiniere | |

\* cited by examiner

METHOD FOR MAINTAINING DETECTION CAPABILITY WHEN A FRAME IN A MULTISPECTRAL IMAGE IS CORRUPTED

RELATED APPLICATIONS

This application claims benefit of and priority to U.S. Provisional Application Ser. No. 62/066,418, filed Oct. 21, 2014, which is incorporated herein by reference in its entirety.

TECHNICAL FIELD

The present application relates to multispectral imaging sensors and more particularly to maintaining partial detection capability when one or more spectral images are corrupt.

BACKGROUND

In object detection using imaging sensors, one of the most common causes of multispectral imaging sensor failure is image corruption, especially solar corruption of a reference image. Imaging sensor images often become corrupt when powerful radiant sources such as the sun enter the field of view (FOV). Of the primary and reference images, the reference image is most susceptible to this corruption, often becoming unusable. Conventional object detection systems cannot account for this corruption and often dismiss the entire frame as unusable.

SUMMARY

According to exemplary embodiments, a system and method for maintaining detection capability when a multispectral reference image is corrupted monitors multispectral gain to identify corrupted images and switches to a single spectrum detection system upon identifying such a corrupted image. Gain indicates corruption when the slope of a best-fit curve based on the gain data increases. The single spectrum detection system works by evaluating the intensity of each pixel in the primary image as compared to surrounding pixels to determine the pixels in a primary spectral image that have intensity values significantly greater than the surrounding pixels. These relatively intense pixels are identified as potential threats. While this single spectrum detection method is not as desirable as a multispectral approach, it provides an effective temporary workaround so that corrupted images can still provide threat warning and protection for the host platform.

In one embodiment, a method for monitoring detection capability when a frame is corrupted is provided. The method includes calculating multispectral gain across a plurality of pixels in an image frame, analyzing the multispectral gain, identifying a corrupted frame based on analyzing the gain, and switching from a multispectral threat detection system to a single spectrum threat detection system upon identifying that the frame is corrupted.

In another embodiment, a system for monitoring detection capability when a frame is corrupted is provided. The system includes a memory, and one or more processors in communication with the memory. The one or more processors are configured to calculate multispectral gain across a plurality of pixels in an image frame, analyze the multispectral gain, identify a corrupted frame based on analyzing the gain, and switch from a multispectral threat detection system to a single spectrum threat detection system upon identifying that the frame is corrupted.

BRIEF DESCRIPTION OF THE DRAWINGS

The accompanying drawings, which are incorporated in and constitute a part of this specification, illustrate one or more embodiments of the invention and, together with the description, help to explain the invention. The embodiments are illustrated by way of example and should not be construed to limit the present disclosure. In the drawings.

DETAILED DESCRIPTION

Conventional multispectral sensors create many data captures via frames over time wherein each frame consists of a primary spectral image encompassing one spectral band, and a reference spectral image encompassing another spectral band. The reference spectral image is then combined with the primary spectral image to evaluate the spectral content ratio of observable phenomena. Usually the bands are chosen such that the primary image spectral band is of a higher intensity for a target of interest than the reference image spectral band. An example use of multispectral imaging sensors is in a military setting to detect and counter a launched ordnance as part of a threat detection system. The spectral content ratio can be used to determine the threat status of a detected observable phenomenon.

Under some circumstances, a light source, such as the sun, may be present in the field of view of an imaging sensor. The optical scatter caused by the light source in the sensor corrupts the entire frame captured by the imaging sensor due to internal reflection in the optics or issues with focal plane readout when high intensities are incident on it. The corruption appears to be worse in the reference spectral image of the frame rather than the primary spectral image of the frame. Conventional object detection systems discard a corrupted frame, which results in loss of data and detection performance. It is undesirable that a corrupted frame is dismissed in its entirety in a threat warning context because a portion of the host platform is left unprotected for each frame during which the corruption persists.

According to exemplary embodiments, a system, method and computer readable medium are provided for maintaining detection capability when a multispectral reference spectral image is corrupted. The detection system described herein monitors multispectral gain to identify corrupted images and switches to a single spectrum detection system upon identifying such a corrupted image. Gain indicates corruption when the slope of a best-fit curve based on the gain data changes substantially or increases. To identify potential threats, the detection system evaluates the intensity value of each pixel in the primary spectral image as compared to intensity values of surrounding pixels to determine the pixels that are significantly more intense in the primary image spectral band than the surrounding pixels.

A frame as used herein may refer to an image in a series of images or a still shot from a video clip or stream. A plurality of frames may be captured by an imaging sensor coupled to a host platform described below. The frame may be analyzed to detect objects and potential threats to the host platform. The frame, as used herein, is a multispectral image, including at least two spectral images—a primary spectral image and a reference spectral image.

Upon identifying a corrupted image, the system switches to a single spectrum detection system. The single spectrum detection system works by evaluating the primary spectral image intensity of each pixel as compared to surrounding pixels to seek out those point sources that are significantly more intense in the primary image spectral band than the surrounding pixels. These relatively intense point sources are identified as potential threats. While this single spectrum method is not as desirable as a multispectral approach, it provides an effective temporary workaround so that corrupted images can still provide threat warning and protection for the host platform.

The reference spectral image is often used to illustrate what the primary spectral image looks like if there were no threats detected in the frame. The optical scatter caused by the sun adds clutter and noise to the reference spectral image, rendering the reference spectral image unsuitable as a 'reference.'

Figure 1:
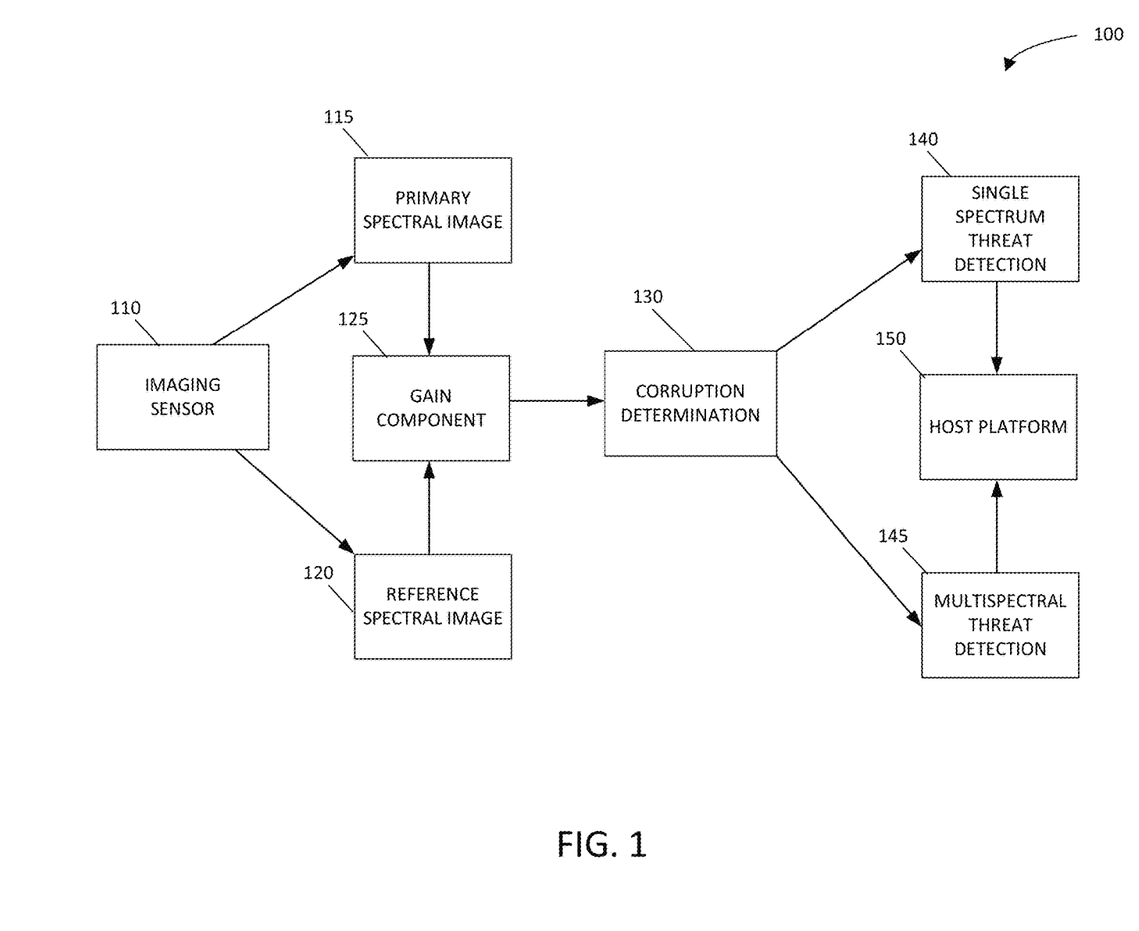
FIG. 1 is a block diagram of a system for maintaining detection capability when a multispectral image is corrupted, according to an example embodiment.

FIG. 1 is a block diagram of a system 100 for maintaining detection capability when a frame is corrupted, according to an example embodiment. The system 100 includes an imaging sensor 110, a gain component 125, a corruption determination component 130, a single spectrum threat detection system 140, a multispectral threat detection system 145, and a host platform component 150. One or more of the components of system 100 may include various circuits, circuitry and one or more software components, programs, applications, or other units of code base or instructions configured to be executed by one or more processors 912, 912' included in computing device 910 described in relation to FIG. 9.

Figure 2:
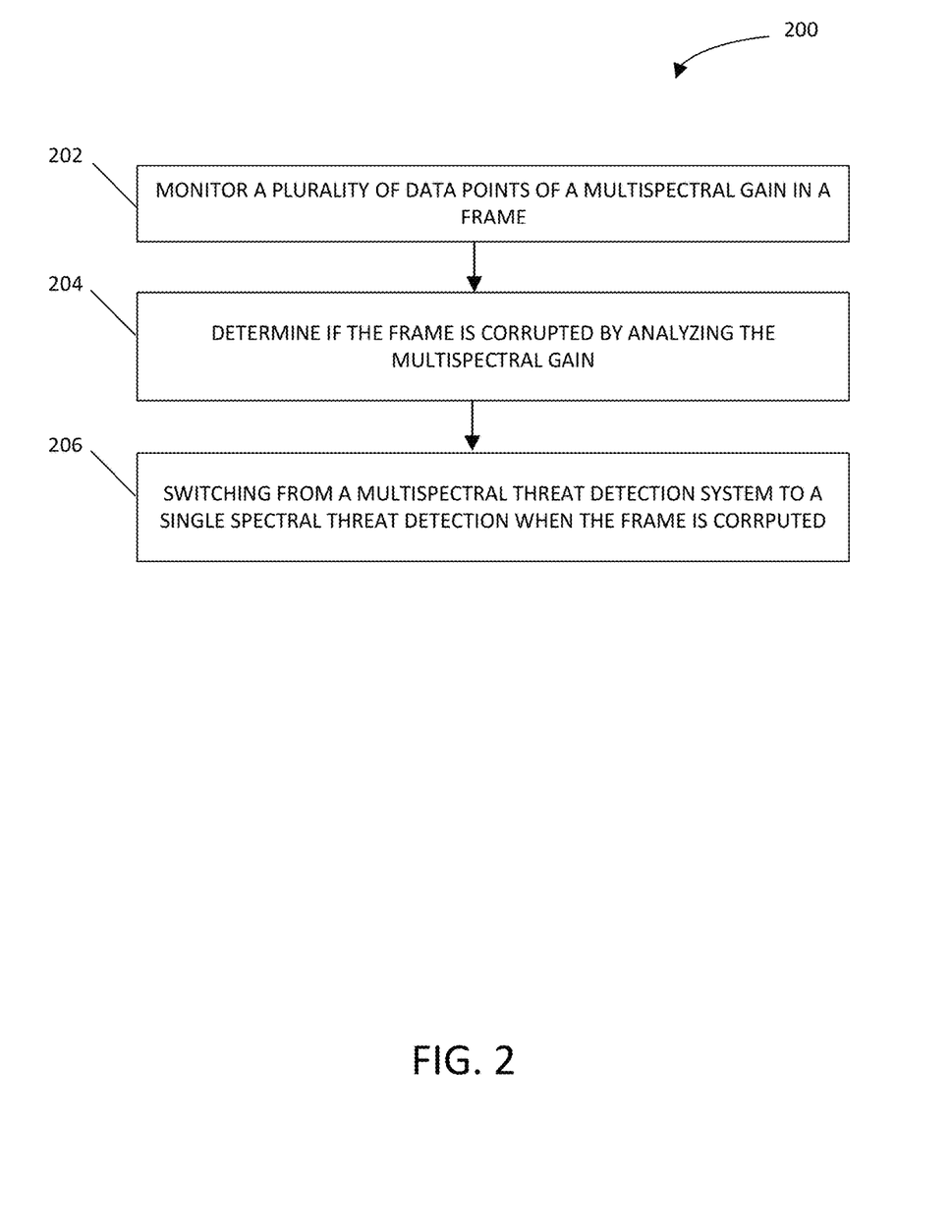
FIG. 2 is a flowchart illustrating a method for maintaining detection capability when a multispectral image is corrupted, according to an example embodiment.

FIG. 2 is a flowchart illustrating a method 200 for maintaining detection capability when a frame is corrupted, according to an example embodiment. The method 200 may be performed using one or more components of system 100 shown in FIG. 1.

The imaging sensor 110 outputs a primary spectral image 115 and a reference spectral image 120. In some embodiments, the imaging sensor 110 is an infrared imaging sensor. In some embodiments, the primary spectral image 115 is generated using the red spectral band, and the reference spectral image 120 is generated using the blue spectral band.

The gain component 125 receives the primary spectral image 115 and the reference spectral image 120 as inputs, and calculates the multispectral gain of the frame using the primary spectral image 115 and the reference spectral image 120. In some embodiments, the multispectral gain is the spectral content ratio between the primary spectral image and the reference spectral image. At step 202, the gain component 125 monitors a plurality of data points of the multispectral gain of the frame.

At step 204, the corruption detection component 130 determines if the frame is corrupted by analyzing the plurality of data points of the multispectral gain of the frame. In some embodiments, the corruption detection component 130 analyzing a slope of a best-fit curve generated based on the plurality of data-points. The corruption detection component 130 determines that the frame is corrupted when there is a substantial or drastic change in the slope of the best-fit curve.

When the corruption detection component 130 determines that the frame is corrupted, at step 206 the frame is provided to the single spectrum threat detection component 140. The single spectrum threat detection component 140 analyzes the primary spectral image of the frame to identify objects in the frame or detect and identify potential threats to the host platform. The single spectrum threat detection component 140 evaluates the primary spectral image intensity value of each pixel as compared to surrounding pixels to seek out those point sources that are significantly more intense in the primary image spectral band than the surrounding pixels. These relatively intense point sources are identified as potential threats. The data related to any detected threats is provided to the host platform component 150.

When the corruption detection component 130 determines that the frame is not corrupted, the frame is provide to the multispectral threat detection component 145. The multispectral threat detection component 145 analyzes the primary spectral image and the reference spectral image to identify objects in the frame and detect potential threats to the host platform. The data related to any detected threats is provided to the host platform component 150.

In this manner, exemplary embodiments of the detection system described herein is able to maintain detection capability when a frame is corrupted.

Figure 3A:
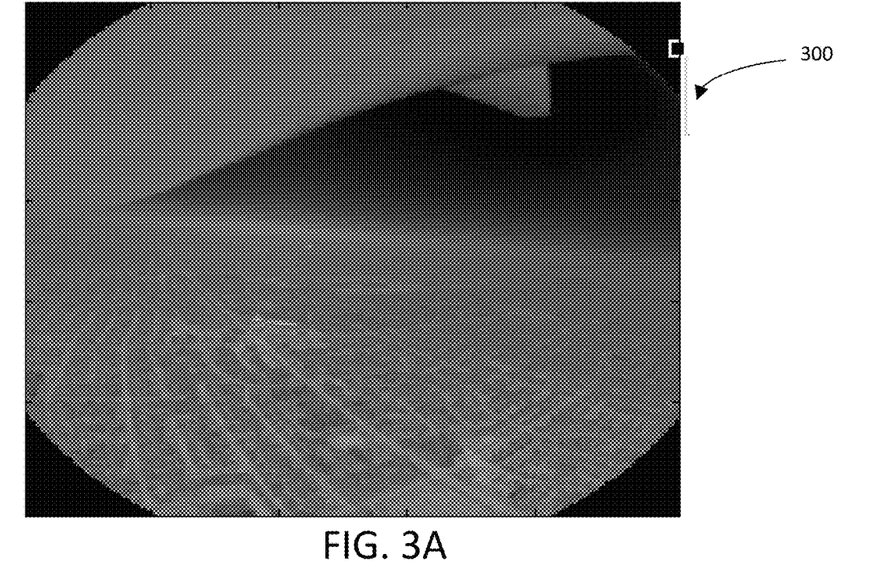
FIG. 3A illustrates a frame not corrupted by a light source.

FIG. 3A illustrates a frame 300 not corrupted by a light source. The frame 300 is processed by the system 100, and the corruption detection component 130 determines that the frame is not corrupted. Therefore, the frame 300 is provided to the multispectral threat detection component 145 for analysis.

Figure 3B:
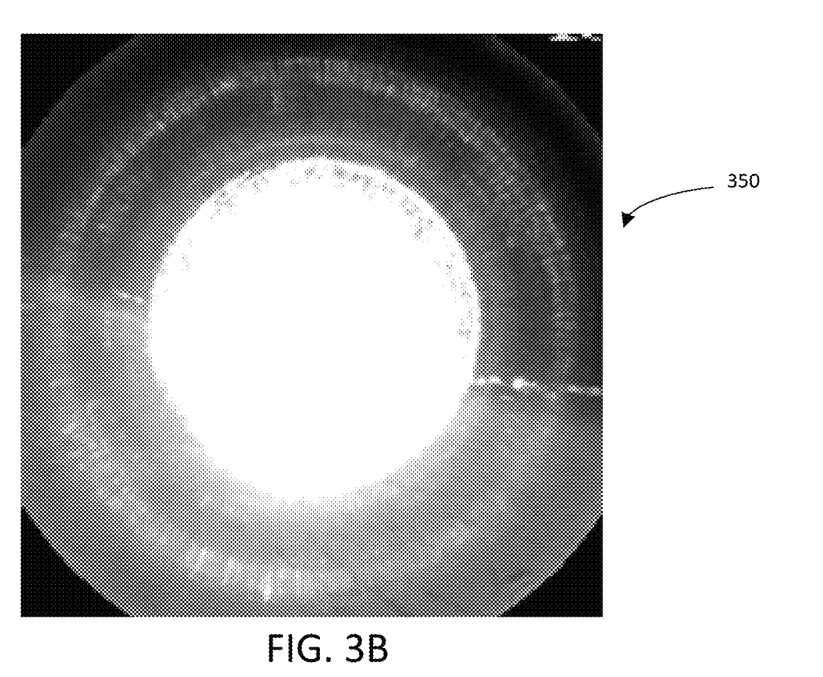
FIG. 3B illustrates a frame corrupted by a light source, such as the sun.

FIG. 3B illustrates a frame 350 corrupted by a light source, such as the sun. The frame 350 is processed by the system 100, and the corruption detection component 130 determines that the frame is corrupted. Therefore, the frame 350 is provided to the single spectrum threat detection component 140 for analysis.

Figure 4A:
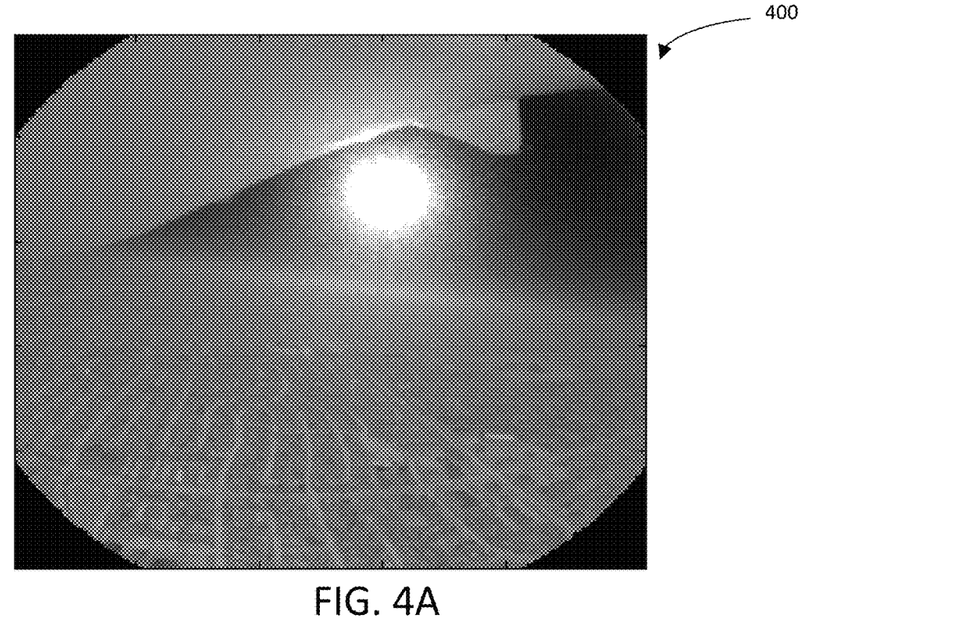
FIG. 4A illustrates a primary spectral image of the frame corrupted by the sun.
Figure 4B:
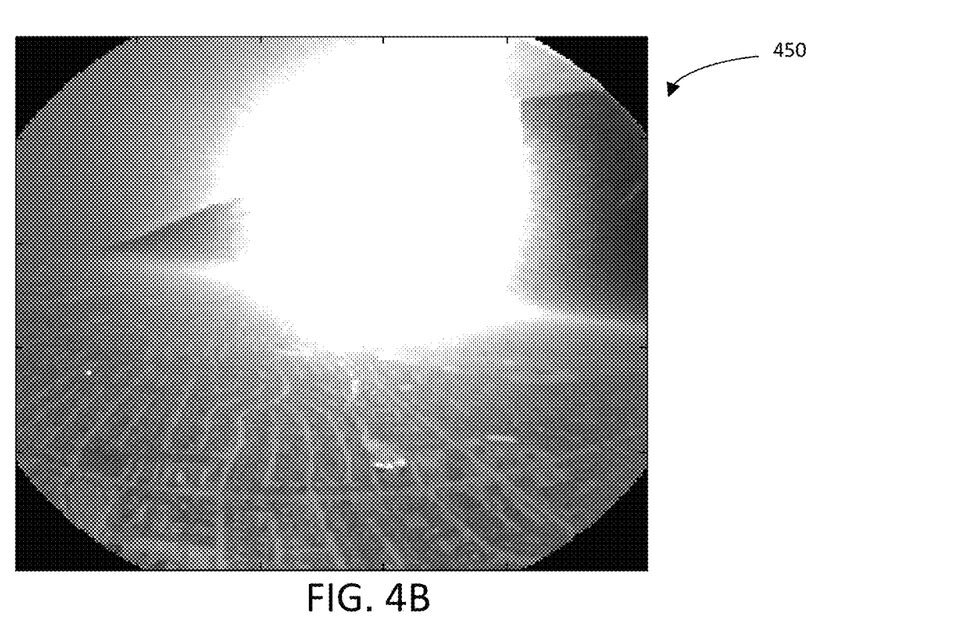
FIG. 4B illustrates a reference spectral image of the frame corrupted by the sun.

FIG. 4A illustrates a primary spectral image 400 of the frame corrupted by the sun. FIG. 4B illustrates a reference spectral image 450 of the frame corrupted by the sun. As FIGS. 4A and 4B illustrate, the primary spectral image 400 is not as affected by the optical scatter caused by the sun, as compared to the reference spectral image 450. The reference spectral image 450 is not a suitable 'reference' for the detection system. As described above, instead of discarding the frame like conventional detection systems, exemplary embodiments described herein analyzes the primary spectral image 400 of the frame to identify object and detect potential threats to the host platform.

Figure 5:
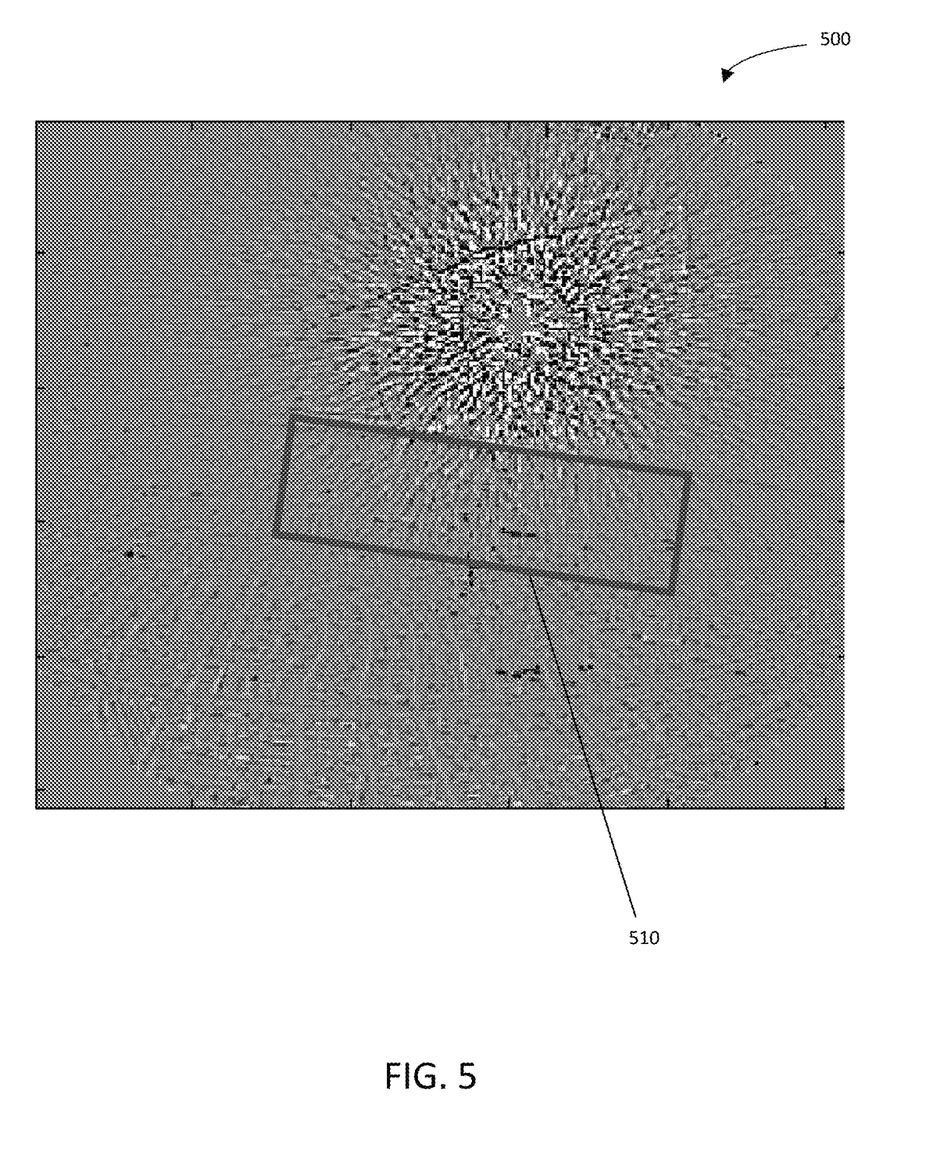
FIG. 5 illustrates a spectral image of the corrupted frame without applying an exemplary embodiment of the detection system described herein.

FIG. 5 illustrates a spectral image 500 of the corrupted frame without applying an exemplary embodiment of the detection system and method described herein. As shown in FIG. 5, the spectral image is affected by optical scatter because of the sun being in the field of view of the imaging sensor at a long range.

Figure 6:
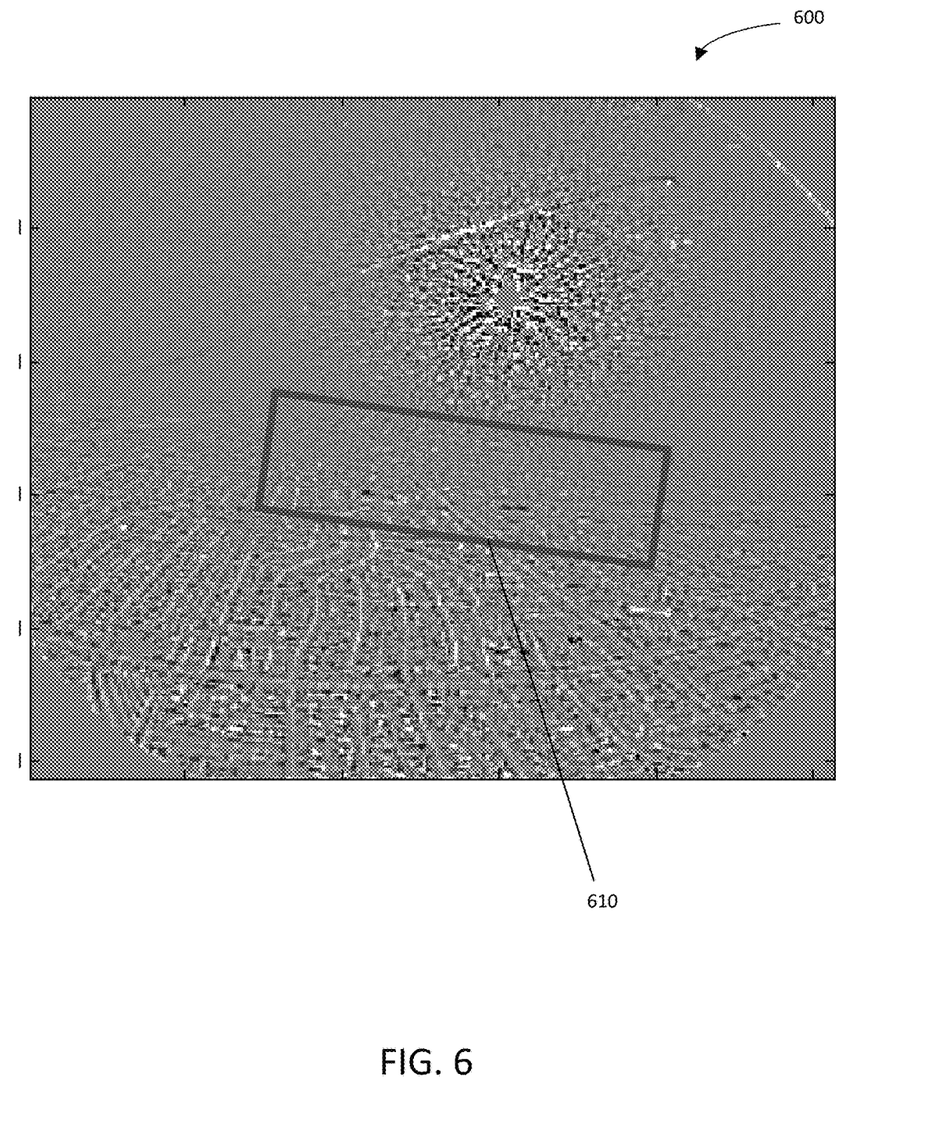
FIG. 6 illustrates a spectral image of the corrupted frame after application of an exemplary embodiment of the detection system described herein.

FIG. 6 illustrates a spectral image 600 of the corrupted frame 450 after application of an exemplary embodiment of the detection system and method described herein. The detection system 100 generates the spectral image 600 that is not affected by optical scatter at long range from the sun, but there is still some noise signal at close range to the sun. The long range area is illustrated by in rectangle 510 in FIG. 5 and in rectangle 610 in FIG. 6. FIGS. 5 and 6 are samples of a multispectral image after the primary and reference images are combined. The primary and reference images are combined to create a single "spectral" image that is used to detect objects of interest. FIG. 5 shows a spectral image before the detection system described herein is applied to the image, where the images are simply combined without regard for corruption in the reference image. FIG. 6 shows the reduced noise and clutter from a spectral image after the detection system described herein has been applied.

Figure 7:
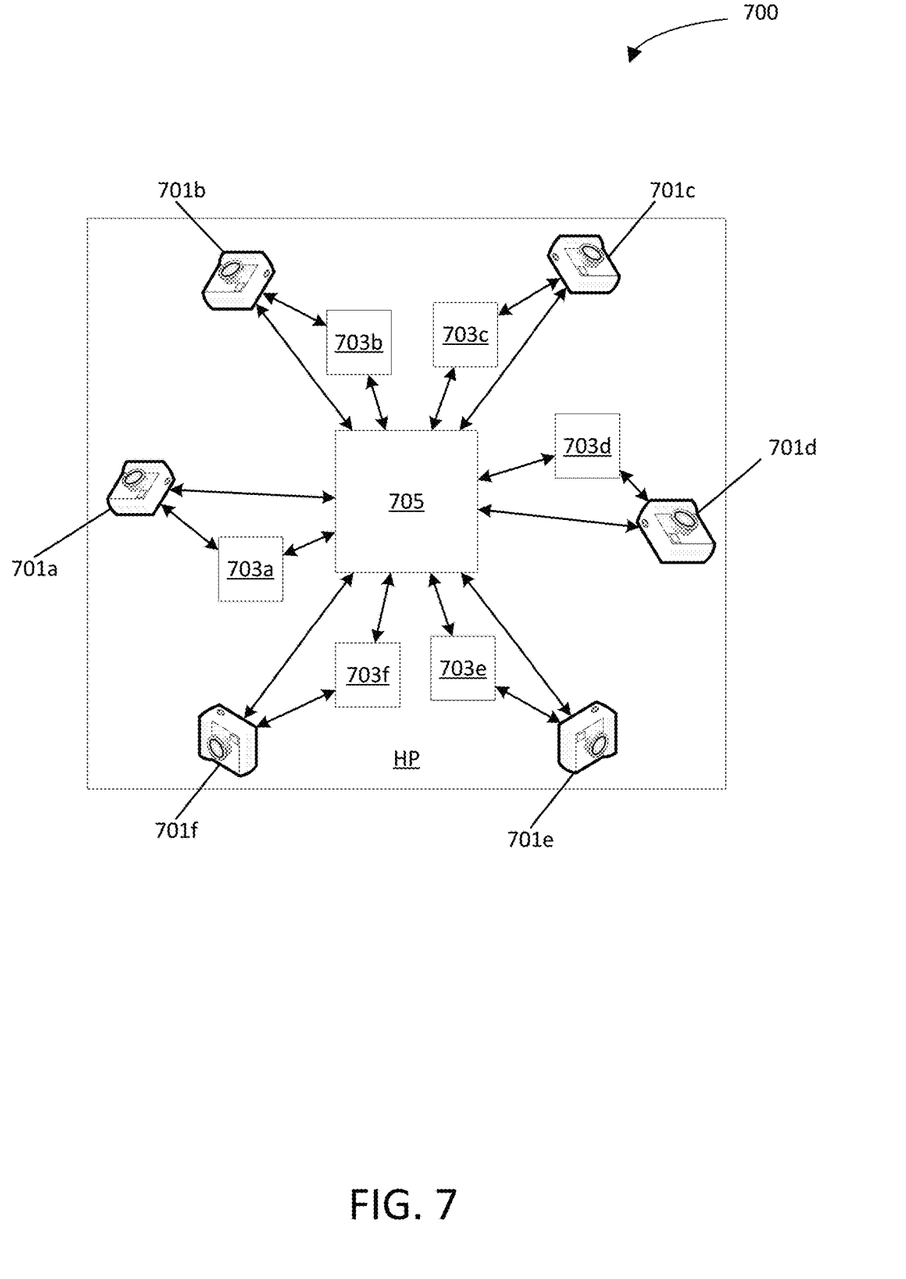
FIG. 7 is a block diagram depicting a system for a distributed on-board imaging system that can be used to implement exemplary embodiments of the range estimation system described herein.

FIG. 7 is a block diagram depicting a system 700 for a distributed on-board imaging system that can be used to implement exemplary embodiments of the detection system and method described herein. The on-board imaging system 700 can be installed on a host platform (HP). The system 700 includes a plurality of image sensors 701a-f installed on the HP, each of the image sensors 701a-f being in electronic communication with at least one processor 703a-f, 705 installed on the HP. As shown in FIG. 7, each image sensor 701a-f is in electronic communication with both a dedicated processor 703a-f and a central processor 705. However, it will be apparent in view of this disclosure that, in accordance with various embodiments, one or more of the image sensors 701a-f can connect exclusively to a central processor 705. It will further be apparent in view of this disclosure that, in accordance with various embodiments, one or more of the image sensors 701a-f can connect exclusively to a dedicated processor 703a-f. It will still further be apparent in view of this disclosure that any combination of sensors per processor or processors per sensor can be used in accordance with various embodiments.

Image sensors 701a-f can be any suitable device such as, for example but not limited to, digital cameras, infrared cameras, optical cameras, video cameras, infrared video cameras, charge-coupled device (CCD) sensors, complementary metal-oxide-semiconductor (CMOS) sensors, focal plane arrays, microbolometers, indium antimonide sensors, indium gallium arsenide sensors, mercury cadmium telluride sensors, quantum well infrared photodetectors, N-type metal-oxide-semiconductor (NMOS) sensors, medical imaging devices, x-ray detectors, any other image sensor, or combinations thereof. It will be apparent in view of this disclosure that image sensors 701a-f, in accordance with various embodiments can encompass any sensor configured to capture electromagnetic radiation in any spectrum for producing an image, including, for example, infrared radiation, visible light, ultraviolet radiation, x-rays, etc.

Dedicated processors 703a-f and central processor 705 can each include, for example, one or more field-programmable gate arrays (FPGA), microprocessors, application specific integrated circuits, integrated circuits, monolithic integrated circuits, microchips, programmable logic devices, complex programmable logic devices, any other suitable processing devices, or combinations thereof. For example, in some embodiments, each dedicated processor 703a-f can be a FPGA for providing temporary storage of a limited number of data captures acquired by the a corresponding image sensor 701a-f and a coarse initial analysis while the central processor 705 can be a microprocessor for conducting more detailed analysis as needed. In various embodiments, the central processor 705 can perform all processing functions, eliminating the need for dedicated processors 703a-f. In various embodiments, the dedicated processors 703a-f can perform all processing functions, eliminating the need for a central processor 705. It will be apparent in view of this disclosure that any other combinations an ratios of processors and image sensors can be used in accordance with various embodiments.

Figure 8:
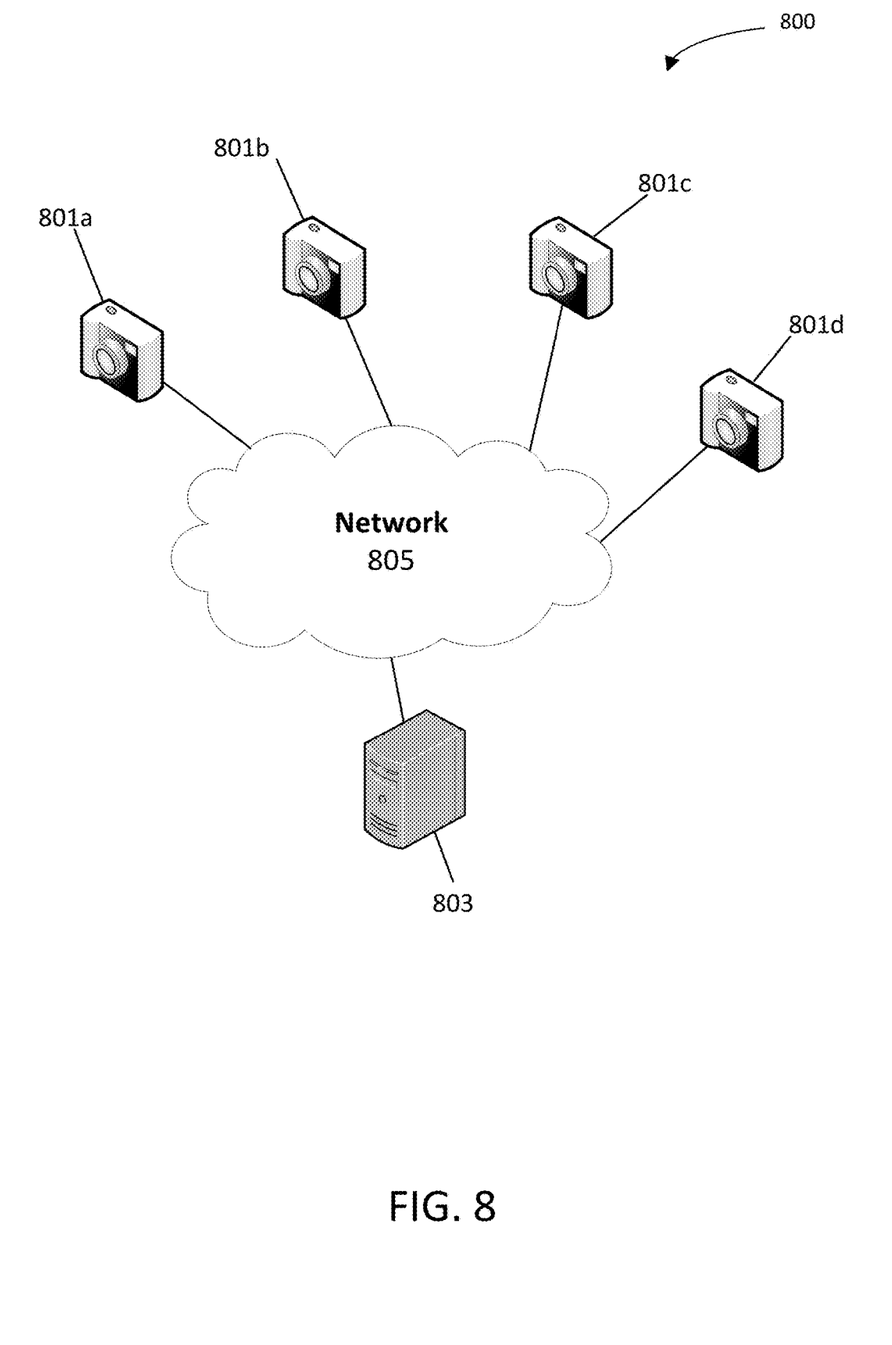
FIG. 8 is a block diagram depicting a distributed imaging system that can be used to implement exemplary embodiments of the range estimation system described herein.

FIG. 8 is a block diagram depicting a distributed imaging system 800 that can be used to implement exemplary embodiments of the detection system and method described herein. Although FIGS. 1 and 7 and portions of the exemplary discussion above, make reference to a centralized system 100, 700 operating with on one or more co-located image sensors and/or processors, one will recognize that various of the components and modules within the system 100, 700 may instead be distributed across a network 805 in separately or remotely located image sensors 801a-d such as digital cameras, infrared cameras, optical cameras, video cameras, infrared video cameras, charge-coupled device (CCD) sensors, complementary metal-oxide-semiconductor (CMOS) sensors, focal plane arrays, microbolometers, indium antimonide sensors, indium gallium arsenide sensors, mercury cadmium telluride sensors, quantum well infrared photodetectors, N-type metal-oxide-semiconductor (NMOS) sensors, medical imaging devices, x-ray detectors, any other image sensor, or combinations thereof and processing systems 803 such as one or more server systems, desktop computer devices, mobile computer devices, field-programmable gate arrays, microprocessors, application specific integrated circuits, integrated circuits, monolithic integrated circuits, microchips, programmable logic devices, complex programmable logic devices, any other suitable processing devices, or combinations thereof. As one example, data captures acquired by the image sensors 801a-d can be received by the remote processing system(s) 803. In some embodiments, the remote processing system(s) 803 can provide feedback to one or more of the image sensors 801a-d. In some distributed remote imaging systems, the image sensors 801a-d and processing systems 803 of the system 100, 800 can be separately located and can be in communication with one another across the network 805.

Figure 9:
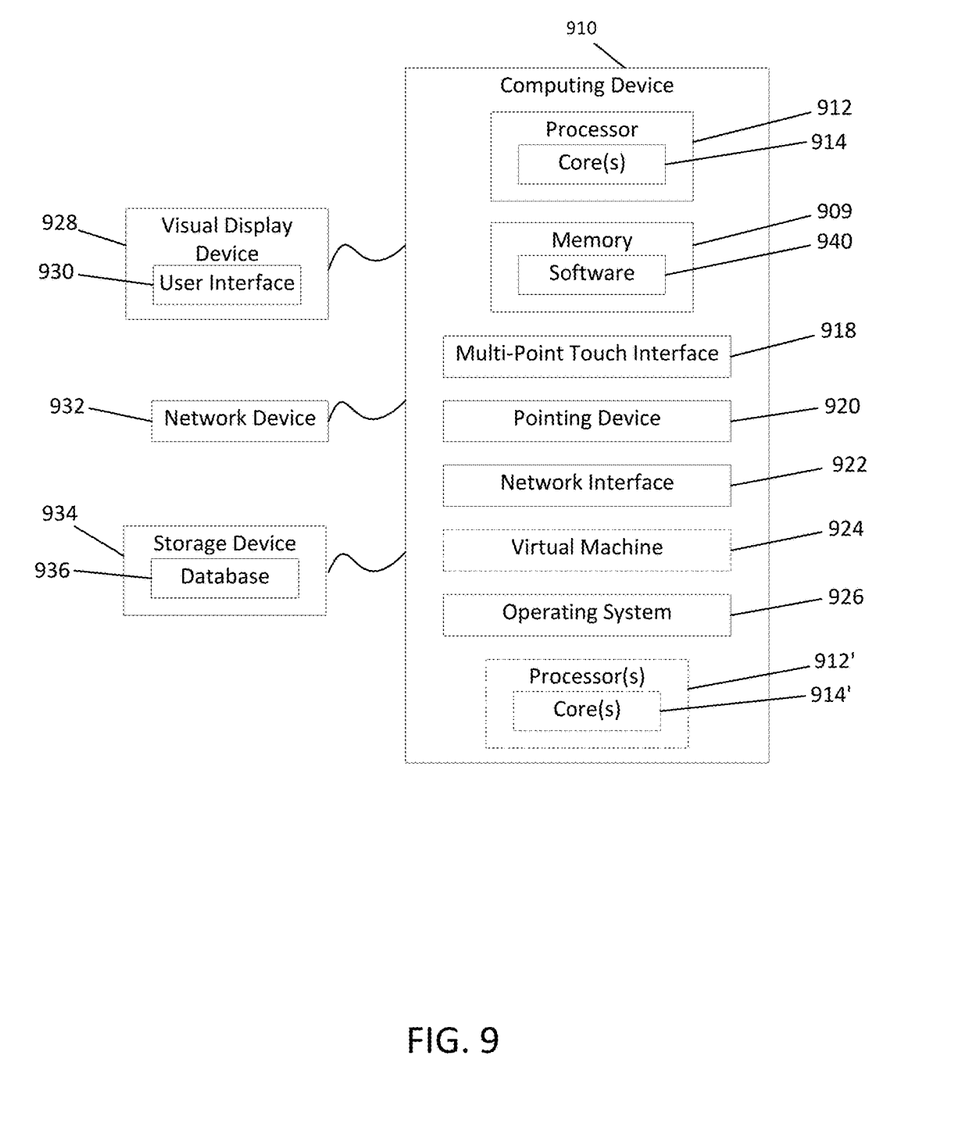
FIG. 9 is a block diagram of an exemplary computing device that can be used to implement exemplary embodiments of the range estimation system described herein.

FIG. 9 is a block diagram of an exemplary computing device 910 as can be used herein, or portions thereof, in accordance with various embodiments of the detection system and method described herein. The computing device 910 can include one or more non-transitory computer-readable media for storing one or more computer-executable instructions or software for implementing exemplary embodiments. The non-transitory computer-readable media can include, but are not limited to, one or more types of hardware memory, non-transitory tangible media (for example, one or more magnetic storage disks, one or more optical disks, one or more flash drives), and the like. For example, memory 909 included in the computing device 910 can store computer-readable and computer-executable instructions or software for performing the operations disclosed herein. For example, the memory 909 can store a software application 940 which is configured to perform various of the disclosed operations (e.g., calculating multispectral gain, determining that the frame is corrupted and switching from the multispectral threat detection system to a single spectrum threat detection system). The computing device 910 can also include configurable and/or programmable processor 912 and an associated core 914, and one or more additional configurable and/or programmable processing devices, e.g., processor(s) 912' and associated core(s) 914' (for example, in the case of computational devices having multiple processors/cores), for executing computer-readable and computer-executable instructions or software stored in the memory 909 and other programs for controlling system hardware. Processor 912 and processor(s) 912' can each be a single core processor or multiple core (914 and 914') processor. In some embodiments, processor 912 and processor(s) 912' can each be one or more of a field-programmable gate array (FPGA), a microprocessor, an application specific integrated circuit, integrated circuit, a monolithic integrated circuit, a microchip, a programmable logic device, a complex programmable logic device, any other suitable processing device, or combinations thereof.

Virtualization can be employed in the computing device 910 so that infrastructure and resources in the computing device can be shared dynamically. A virtual machine 924 can be provided to handle a process running on multiple processors so that the process appears to be using only one computing resource rather than multiple computing resources. Multiple virtual machines can also be used with one processor.

Memory 909 can include a computational device memory or random access memory, such as DRAM, SRAM, EDO RAM, and the like. Memory 909 can also include, for example, flip-flops, memory blocks, RAM blocks, programmable read-only memory, and the like. Memory 909 can include other types of memory as well or combinations thereof.

A user can interact with the computing device 910 through a visual display device 928, such as a computer monitor, which can display one or more user interfaces 930 that can be provided in accordance with exemplary embodiments. The computing device 910 can include other I/O devices for receiving input from a user, for example, a keyboard or any suitable multi-point touch interface 918, or a pointing device 920 (e.g., a mouse). The keyboard 918 and the pointing device 920 can be coupled to the visual display device 928. The computing device 910 can include other suitable conventional I/O peripherals.

The computing device 910 can also include one or more storage devices 934, such as a hard-drive, CD-ROM, or other computer readable media, for storing data and computer-readable instructions and/or software that perform operations disclosed herein. Exemplary storage device 934 can also store one or more databases 936 (e.g., image recognition database 110 and/or sorted object database 140) for storing any suitable information required to implement exemplary embodiments. The databases 936 can be updated manually or automatically at any suitable time to add, delete, and/or update one or more items in the databases.

The computing device 910 can include a network interface 922 configured to interface via one or more network devices 932 with one or more networks, for example, Local Area Network (LAN), Wide Area Network (WAN) or the Internet through a variety of connections including, but not limited to, standard telephone lines, LAN or WAN links (for example, 802.11, T1, T6, 56 kb, X.25), broadband connections (for example, ISDN, Frame Relay, ATM), wireless connections, controller area network (CAN), or some combination of any or all of the above. The network interface 922 can include a built-in network adapter, network interface card, PCMCIA network card, card bus network adapter, wireless network adapter, USB network adapter, modem or any other device suitable for interfacing the computing device 910 to any type of network capable of communication and performing the operations described herein. Moreover, the computing device 910 can be any computational device, such as a workstation, desktop computer, server, laptop, handheld computer, tablet computer, or other form of computing or telecommunications device that is capable of communication and that has sufficient processor power and memory capacity to perform the operations described herein.

The computing device 910 can run any operating system 926, such as any of the versions of the Microsoft® Windows® operating systems, the different releases of the Unix and Linux operating systems, any version of the MacOS® for Macintosh computers, any embedded operating system, any real-time operating system, any open source operating system, any proprietary operating system, or any other operating system capable of running on the computing device and performing the operations described herein. In exemplary embodiments, the operating system 926 can be run in native mode or emulated mode. In an exemplary embodiment, the operating system 926 can be run on one or more cloud machine instances.

The above description has been presented to enable a person skilled in the art to create and use a computer system configuration and related method and article of manufacture to recognize images based on multiple contextual factors. Various modifications to the example embodiments will be readily apparent to those skilled in the art, and the generic principles defined herein may be applied to other embodiments and applications without departing from the spirit and scope of the invention. Moreover, in the following description, numerous details are set forth for the purpose of explanation. However, one of ordinary skill in the art will realize that the invention may be practiced without the use of these specific details. In other instances, well-known structures and processes are shown in block diagram form in order not to obscure the description of the invention with unnecessary detail. Thus, the present disclosure is not intended to be limited to the embodiments shown, but is to be accorded the widest scope consistent with the principles and features disclosed herein.

In describing exemplary embodiments, specific terminology is used for the sake of clarity. For purposes of description, each specific term is intended to at least include all technical and functional equivalents that operate in a similar manner to accomplish a similar purpose. Additionally, in some instances where a particular exemplary embodiment includes a plurality of system elements, device components or method steps, those elements, components or steps may be replaced with a single element, component or step. Likewise, a single element, component or step may be replaced with a plurality of elements, components or steps that serve the same purpose. Moreover, while exemplary embodiments have been shown and described with references to particular embodiments thereof, those of ordinary skill in the art will understand that various substitutions and alterations in form and detail may be made therein without departing from the scope of the invention. Further still, other embodiments, functions and advantages are also within the scope of the invention.

Exemplary flowcharts are provided herein for illustrative purposes and are non-limiting examples of methods. One of ordinary skill in the art will recognize that exemplary methods may include more or fewer steps than those illustrated in the exemplary flowcharts, and that the steps in the exemplary flowcharts may be performed in a different order than the order shown in the illustrative flowcharts.

What is claimed is:

1. A method for monitoring detection capability when a frame is corrupted, the method comprising:
   calculating multispectral gain across a plurality of pixels in an image frame;
   analyzing said multispectral gain;
   identifying a corrupted frame based on analyzing the gain; and
   switching from a multispectral threat detection system to a single spectrum threat detection system upon identifying that the frame is corrupted, wherein analyzing said multispectral gain comprises analyzing a slope of a best-fit curve generated based on a plurality of data points from the multispectral gain.

2. The method of claim 1, wherein identifying the corrupted frame is based on a substantial change in the slope of the best-fit curve.

3. The method of claim 1, wherein the frame comprises a primary spectral image and a reference spectral image.

4. The method of claim 3, wherein the multispectral gain is a spectral content ratio between the primary spectral image and the reference spectral image.

5. The method of claim 3, wherein the primary spectral image is generated using a red spectral band.

6. The method of claim 3, wherein the reference spectral image is generated using a blue spectral band.

7. The method of claim 3, wherein the single spectral threat detection system uses the primary spectral image to detect an object or a threat.

8. The method of claim 3, wherein the multispectral threat detection system uses the primary spectral image and the reference spectral image to detect an object or a threat.

9. A system for monitoring detection capability when a frame is corrupted, the system comprising:
   a memory;
   one or more processors in communication with the memory, the one or more processors configured to:
   calculate multispectral gain across a plurality of pixels in an image frame;
   analyze said multispectral gain;
   identify a corrupted frame based on analyzing the gain; and
   switch from a multispectral threat detection system to a single spectrum threat detection system upon identifying that the frame is corrupted, wherein analyzing said multispectral gain comprises analyzing a slope of a best-fit curve generated based on a plurality of data points from the multispectral gain.

10. The system of claim 9, wherein identifying the corrupted frame is based on a substantial change in the slope of the best-fit curve.

11. The system of claim 9, wherein the frame comprises a primary spectral image and a reference spectral image.

12. The system of claim 11, wherein the multispectral gain is a spectral content ratio between the primary spectral image and the reference spectral image.

13. The system of claim 11, wherein the primary spectral image is generated using a red spectral band.

14. The system of claim 11, wherein the reference spectral image is generated using a blue spectral band.

15. The system of claim 11, wherein the single spectral threat detection system uses the primary spectral image to detect an object or a threat.

16. The system of claim 11, wherein the multispectral threat detection system uses the primary spectral image and the reference spectral image to detect an object or a threat.

17. The system of claim 9, wherein the frame is captured using an infrared imaging sensor.

18. A non-transitory computer readable medium storing instructions executable by a processing device, the instructions implementing a method for monitoring detection capability when a frame is corrupted, execution of the instructions causes the processing device to:
   calculate multispectral gain across a plurality of pixels in an image frame;
   analyze said multispectral gain;
   identify a corrupted frame based on analyzing the gain; and
   switch from a multispectral threat detection system to a single spectrum threat detection system upon identifying that the frame is corrupted, wherein analyzing said multispectral gain comprises analyzing a slope of a best-fit curve generated based on a plurality of data points from the multispectral gain.

* * * * *